March 13, 1956     M. K. COSKUN     2,738,185
SPRING AND AXLE ASSEMBLY
Filed April 15, 1952     2 Sheets-Sheet 1
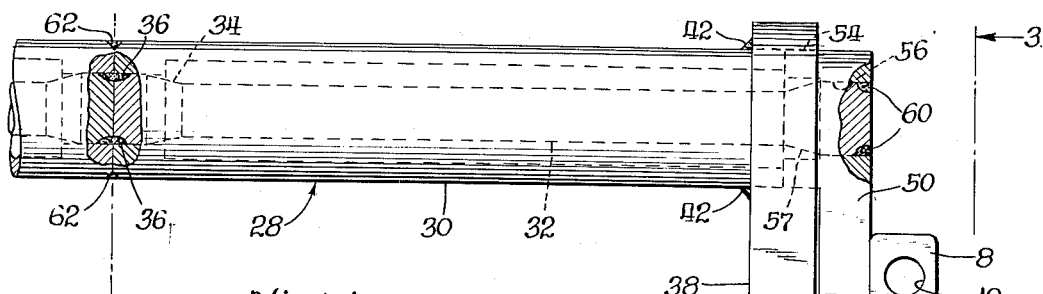
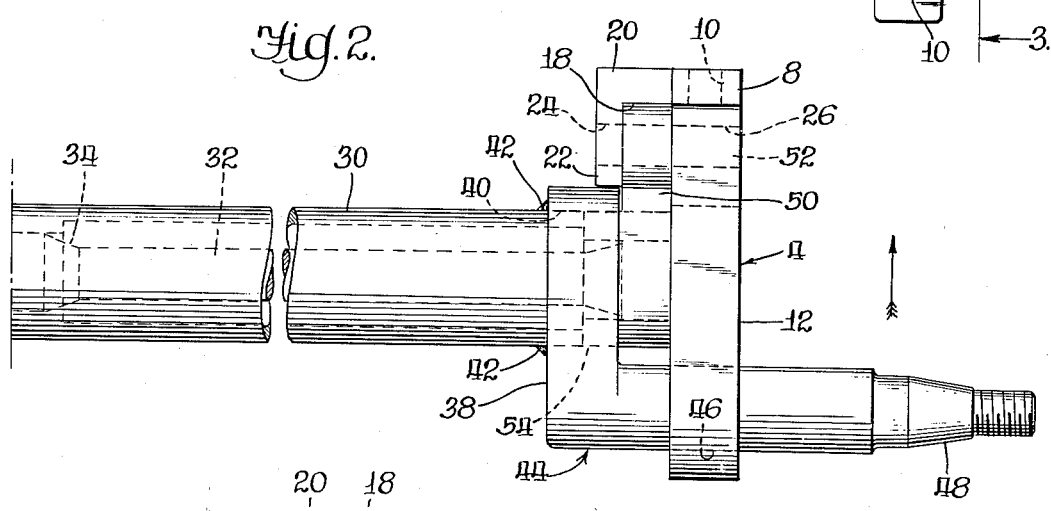
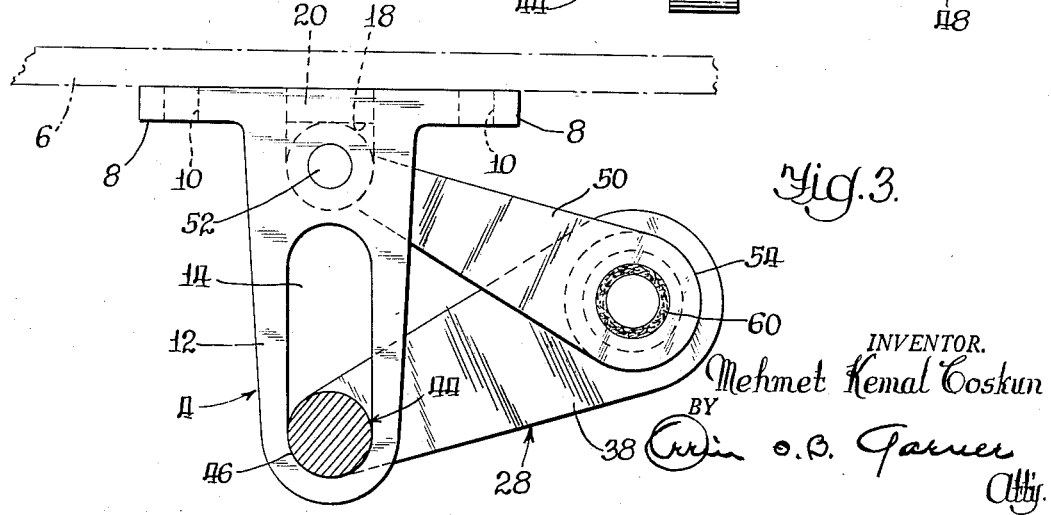
INVENTOR.
Mehmet Kemal Coskun
BY O. B. Garner
Atty.

March 13, 1956 M. K. COSKUN 2,738,185
SPRING AND AXLE ASSEMBLY
Filed April 15, 1952 2 Sheets-Sheet 2
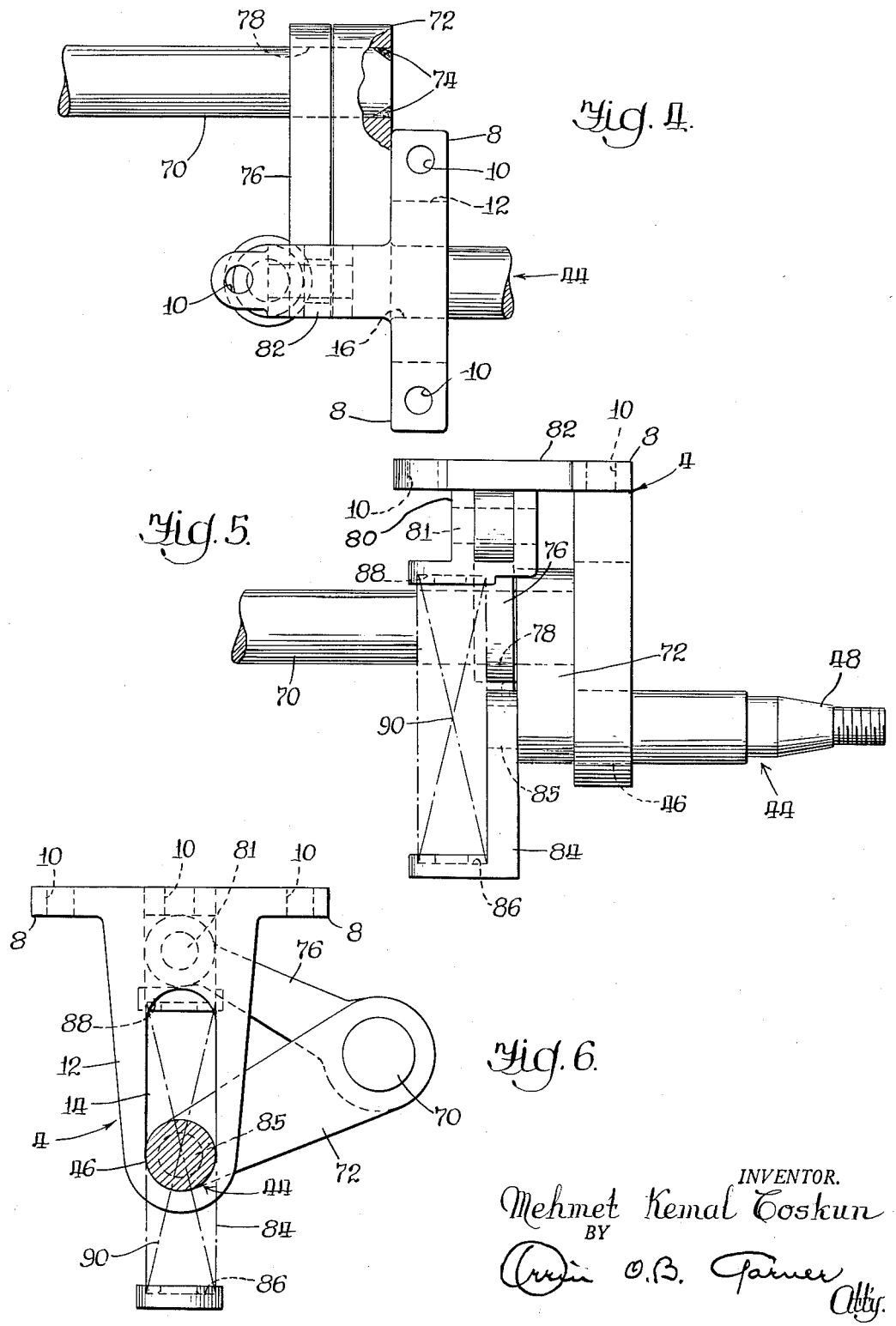
INVENTOR.
Mehmet Kemal Coskun
BY
O. B. Garner
Atty.

United States Patent Office 2,738,185
Patented Mar. 13, 1956

2,738,185

SPRING AND AXLE ASSEMBLY

Mehmet Kemal Coskun, Granite City, Ill., assignor to American Steel Foundries, Chicago, Ill., a corporation of New Jersey Application April 15, 1952, Serial No. 282,325

20 Claims. (Cl. 267—57)

The invention relates to a novel axle assembly offering wheeled support for an associated vehicle body.

A general object of the invention is to utilize the elasticity of a metallic torsion bar to offer cushioned support for a carried vehicle body.

Another object of the invention is to design an axle having "level load" characteristics, that is, wherein the vehicle body is maintained in a substantially horizontal plane.

Still another object of my invention is to design a wheel and axle assembly offering vehicle support having constant relation to a fixed center of gravity of the related body.

Still a more detailed object of my invention is to utilize a torsion bar resiliently supporting an associated body and have the torsion bar protected against rust and other corrosive elements, thereby reducing the possibility of fatigue failure.

Other objects of the invention will become apparent in the course of the following description, wherein:

Figure 1 is a plan view of the axle, only one-half of the axle being shown, inasmuch as it is duplicated in the other portion;

Figure 2 is a front elevational view of the axle;

Figure 3 is a side elevational view of the axle;

Figure 4 is a plan view, similar to Figure 1, of another embodiment of the invention;

Figure 5 is a front elevational view of the embodiment of Figure 4, and

Figure 6 is a side elevational view of the same.

In describing the invention in detail, reference is herein made, unless otherwise noted, to one-half of the assembly only, it being understood that said assembly is identical in every detail in the other portion thereof.

Referring to Figures 1 to 3, a guide bracket, generally designated 4, is designed for connection with an associated vehicle body, the floor of which is indicated in phantom at 6 in Figure 3. A connection is herein provided by means of the wings 8 integrally formed with the bracket 4 and having holes 10, offering means to bolt the bracket to the related vehicle body, but it is apparent that any reasonable type of connection could be utilized. Centrally of the bracket 4, a depending pedestal 12 may be formed defining therein the vertically disposed slot 14, which extends transversely through the pedestal 12. The inside surface 16 of the slot 14 is preferably formed of conventional bearing material, such as bronze which may be bonded to the pedestal to form a durable bearing surface, the function of which is hereinafter more fully described. An integral supporting jaw 18 is formed on the inboard face of the bracket 4 adjacent its upper end and is defined by the extended plate 20 and the lug 22 depending from the end thereof. Aligned holes 24 and 26 are coaxially formed in the lug 22 and the pedestal 12, respectively, said holes extending transversely of the bracket 4 and their common axis is vertically in line with the long axis of the slot 14, as seen in Figure 3.

The axle assembly, generally designated 28, comprises the tubular torque transmitting shaft 30 extending transversely of the associated vehicle body.

Adjacent the transverse center line 27 of the axle assembly 28, the inside diameter of the torque shaft 30 is preferably necked down, that is, of reduced inside diameter to provide for snug reception of the adjacent end of the torsion bar or rod 32. The end 34 of the torsion rod 32 may be circumferentially scarfed and gouged to provide a relatively strong J-weld rigid connection to the related reduced inside diameter of the torque shaft 30, as shown at 36 in Figure 1. Thus the shaft 30 and the rod 32, due to the rigid connection therebetween, may be considered an integral torque unit or torque member. In cross section, the torque shaft 30 and the torsion rod 32 are preferably of circular form disposed about a common longitudinal axis.

A throw or lever 38 is fixedly connected and extended transversely of the outboard end of the torque shaft 30. Said connection is preferably made by the defined hole 40 in one end of the throw partially receiving the related end of the torque shaft 30 and having a rigid connection thereto by means of the fillet weld 42.

The end of the throw 38 opposite the mentioned end merges with the outboardly extended wheel shaft, indicated generally at 44. As illustrated, the wheel shaft 44 is of cylindrical form throughout its entire length, but it will be readily apparent that other contours would fit the functional requirements of the invention. The wheel shaft 44 is received by the slot 14 of the guide bracket 4. The design is such that the slot movably accommodates said shaft and acts as a vertical guide therefor, hence the periphery of the shaft 44 is provided with a bearing surface at 46 in the area of contact between the slot 14 and the shaft 44. This bearing surface is preferably formed by case hardening the surface 46, thus affording excellent bearing means between the shaft 44 and the mentioned bonded bronzed surface 16 of the guiding slot 14. A spindle 48 is formed on the outboard end of the wheel shaft 44, said spindle affording a rotatable mounting for a related wheel (not shown) by means of a conventional cup, cone, bearing assembly. It is to be noted that the axis of the spindle and the common axis of the torque shaft and torsion bar are preferably parallel.

A crank arm 50 is pivotally supported in the guide bracket 4 by having one end thereof embraced by the jaw 18 and said arm is connected thereto by means of the pin 52 which may be fixedly secured at its opposite ends by means of press fit in the hole 24 of the lug 22 and press fit in the hole 26 of the pedestal 12. The crank arm 50 extends transversely of the axis of the torsion shaft 30 and parallels the throw 38, as seen in Figure 1, the plan view. It is also to be noted that said arm and throw form a scissor-like mechanism as seen in the side view, Figure 3. A cylindrical boss 54 is formed on one end of the crank arm 50 and is movably received by the hole 40 in the adjacent end of the throw 38, having its reception limited by the abutting interference of the end of the torque arm 30. But the arm 50 is without fixed connection to the torque shaft or throw, hence is free to rotate about the axis of the torque shaft 30. Centrally of the boss 54, a hole 56 is formed and extends through the boss 54 and arm 50 to snugly receive the related end 57 of the torsion rod 32, the axis of the rod being common with the axis of the hole. Rigid connection is made between the rod 32 and the arm 50 preferably by scarfing and gouging the end 57 of the rod to provide for a secure J-weld connection as at 60.

To facilitate assembly and still have a rigid axle unit extending from both sides of the center line 27, the tubular torque shaft may be split transversely along the center line 27. Torsion bars 32 are then inserted and welded to the respective halves of the torque shaft 30. The split ends of the torque shaft 30 are then scarfed and ground to present reasonably flat complementary surfaces for reassembly. The reassembly is accomplished by abutting the respective halves of the torque shaft and welding circumferentially as at 62.

In operation, pressure is induced to the axle assembly 28 in a substantially vertical direction indicated by the arrow in Figure 2, the pressure being due to the loading of the supported vehicle, the wheel or wheels striking impediments in the terrain while in motion, or a combination of these factors. The induced pressure urges the spindle 44 vertically in the guide slot 16 and to accommodate this motion, inasmuch as the distance between the axis of the spindle 44 and the axis of the torque shaft 30 is constant, the crank arm 50 is urged angularly upward about the pin 52. A torqueing or twisting moment proportional to the reduction of the angle between the torque arm 50 and the throw 38, as seen in the side elevational view, Figure 3, is then induced into the assembly. The torque transmitting shaft 30 is designed to afford maximum resistance to the stress or twisting moment so induced, with minimum torsional deformation, hence carrying or transmitting said stress to the torsion rod 32 by means of the central rigid connection therebetween. The torsion rod 32, due to the connection 60 at its outboard end to the crank arm 50, resists axial rotation, hence resiliently absorbs the induced twisting moments by torsional deformation about its central longitudinal axis.

It is to be noted that the area of the torsion rod 32 in cross section, must be designed relative to the capacity of the associated vehicle, inasmuch as the induced twisting moment must stress the torsion bar below its elastic limit to prevent permanent deformation which would result in the loss of the spring action of the axle.

It is also to be noted that the torque shaft 30, being relatively rigid, transmits angular motion of the throw 38 adjacent one side of the body to the similar throw adjacent the other side of the body resulting in concurrent action of the throws under all circumstances. The result of this action is to maintain the related vehicle body in a substantially horizontal plane.

It is also to be noted that the torsion rod 32 is entirely enclosed, hence protected from contact with moisture and the like, thus reducing corrosion possibilities which in turn could cause surface faults resulting in fatigue failure of said rod.

Referring now to Figures 4 through 6, to illustrate another embodiment of my invention wherein numerals corresponding to those used in Figures 1 to 3 are again used to designate corresponding parts.

The general disposition and method of attaching the embodiment of Figures 4 to 6 to the related body is similar to that described relative to the embodiment of Figures 1 to 3. However, certain structural differences are to be noted. The torque transmitting shaft, herein designated 70, is rigidly secured to the related throw 72 by the J-weld connection shown at 74 in Figure 4. The throw extends transversely of the shaft and merges with the spindle 44 which, as hereinbefore noted, is guided by the bearing means 4. The crank arm 76 movably receives the torque shaft 70 inboardly of the shaft's connection to the related throw 72, by the sleeved reception of said shaft in the hole 78 adjacent one end of the crank arm 76. The shaft 70 is free to rotate within said hole 78 of the crank arm 76. The opposed end of the crank arm 76 is pivotally mounted, as by pin 81, to the mounting bracket 80 depending from the plate 82, which in turn is integral with and extended inboardly from the bearing means 4.

A plate 84 is movably secured to a nub or boss 85 formed on the inboard face of the throw 72 in alignment with the longitudinal center line of the spindle 44. Thus the plate 84 is free to pivot or rotate about the axis of the spindle 44. The plate 84 merges with the spring seat 86 formed on the lower end of said plate and normal to the inboard face thereof. Another spring seat 88 is formed integral with the bracket 80 and is preferably in vertical alignment with the before mentioned spring seat 86.

The spring seats 86 and 88 receive and seat spring means such as the preferred coiled spring indicated by symbol at 90.

The operation of the embodiment of Figures 4 to 6 is substantially similar to that referred to in the preceding embodiment. The spindle 44 moves vertically in response to relative action of the supporting wheel with respect to the supported body. In response to this action or spindle movement, the torque shaft 70, though floating, is urged to rotate about its longitudinal axis hence maintaining "level load," as noted above. As the spindle moves vertically, that motion is cushioned and resisted by compression of the coiled spring 90. Due to the pivotal connection between the throw 72 and the spring seat supporting plate 84, the spring seat 86 is maintained in a horizontal plane and in substantial vertical alignment with the other spring seat 88 during movement of the throw 72.

I claim:

1. In an axle assembly for supporting a related vehicle body structure, a vertically movable spindle, a torque shaft spaced transversely from said spindle, a throw interconnecting said spindle and said torque shaft, spring means coaxially aligned with said torque shaft and fixedly connected thereto, a crank arm pivotally connected to the body and movably related to said throw and rigidly connected to said spring means, said assembly being formed and arranged to flexibly resist relative vertical movement of said spindle, and slot means in said structure receiving said spindle and being operative to guide said spindle in a vertical path.

2. In an axle assembly for supporting a related vehicle body, vertically movable means for supporting a rotatable wheel on an axis extending transversely of said body, means to connect said supporting means to a floating shaft having an axis parallel to the axis of said supporting means, means to connect spring means to one end of the shaft, means to afford connection between the spring means and the related body resulting in flexible resistance being offered to the motion of the vertically movable means, and slot means receiving said supporting means and operative to guide same in a vertical path.

3. In a supporting assembly for a related vehicle body, a torque shaft extending transversely of said body, throws extending transversely of the shaft and connected to respective ends thereof, spindles extending from the respective throws at points spaced transversely from the shaft, a bracket connected to each side of said body guiding vertical movement of the related spindle, a crank arm pivotally connected to each bracket at a point above the adjacent spindle, and spring means fixedly connected to each crank arm and having connection to said shaft and operative to flexibly resist vertical movement of said spindles.

4. In a supporting assembly for a related vehicle body, vertically movable wheel mounting shafts, a torque transmitting shaft in floating relation to the body and spaced transversely from said wheel mounting shafts, throws rigidly interconnecting said torque transmitting shaft and said wheel mounting shafts, a single torsion rod disposed coaxially within and secured to said torque transmitting shaft, brackets connected to respective sides of said body guiding vertical movements of said wheel mounting shafts, crank arms each having one of its ends rigidly secured to said torsion rod at points remote from the connection between said torsion rod and said torque transmitting shaft, and the other of its ends pivotally connected to said bracket.

5. In an axle assembly for supporting a related vehicle body, a torque transmitting shaft in floating relation to the body, throws secured to the ends of said shaft, wheel spindles secured to respective throws, body mounted brackets supporting and vertically guiding said spindles, crank arms pivotally connected to the respective brackets, and a single torsion rod disposed coaxially within said torque transmitting shaft and rigidly secured to said shaft centrally of said rod, and having its ends rigidly secured to the respective crank arms.

6. In an axle assembly for supporting a related vehicle body, a torsion rod in floating relation to the body and having one end thereof fixed to resist rotational movement of said rod about its longitudinal axis, a movable wheel supporting shaft, guiding means to restrict said shaft to linear movement, and means interconnecting the body, the shaft and the rod operative to translate the movement of the shaft into a twisting moment in said rod resulting in a cushioning of the movement of said shaft, said translating means consisting of a throw having a rigid connection at one end to said shaft, and a torque transmitting shaft having spaced connections to the torsion rod and to the end opposite the mentioned end of said throw, respectively, said torque transmitting shaft being of tubular cross section and disposed to surround said torsion rod and having a common longitudinal axis therewith.

7. In an axle assembly, a floating torque shaft, a movable spindle, a throw operatively interconnecting said shaft and said spindle, a crank arm pivoted to and movably supporting said shaft, a bracket pivotally carrying said crank arm, said bracket defining a vertical slot receiving the spindle and restricting the motion of said spindle to the vertical, and spring means operatively supported by said bracket and connected to the shaft to cushion the movement of said spindle.

8. An axle assembly according to claim 7, wherein said shaft is supported by said crank arm through a torsion spring connected to the shaft and the arm.

9. In an axle assembly for supporting a related vehicle body, throws similarly disposed adjacent respective sides of the body, shafts extending outwardly of said throws and each being operative to rotatably support a related wheel, bearing means for guiding linear movement of said shafts in the vertical direction, a rigid shaft interconnecting said throws at points spaced transversely of said shafts whereby said throws move in concert, and spring means each having an end connected to the rigid shaft and another end secured to said bearing means whereby concurrent movement of said throws is cushioned and resisted.

10. A supporting assembly according to claim 3, wherein a bracket presents a vertical slot receiving the related spindle.

11. A supporting assembly according to claim 10, wherein said spring means includes a seat connected to each spindle, another seat connected to each bracket, and resilient means interposed between the seats.

12. A supporting assembly according to claim 10, wherein said spring means includes a torsion rod disposed within a longitudinal aperture in said torque shaft.

13. In a supporting assembly for a related vehicle body, a torque shaft extending transversely of the body and in floating relation to the body, a bracket connected to the body, a crank arm pivoted to the bracket and pivotally connected to the shaft, a throw rigidly connected to the torque shaft, a spindle carried by the throw eccentrically of the shaft, vertical guides on said bracket receiving said spindle, and spring means operatively interposed between the crank arm and throw whereby vertical movement of the spindle is resiliently resisted.

14. A supporting assembly according to claim 13, wherein said spring means consists of a torsion rod.

15. A supporting assembly according to claim 14, wherein the torsion rod is surrounded by said torque shaft and is connected at spaced points to the torque shaft and the crank arm.

16. A supporting assembly according to claim 13, wherein said spring means comprises seats on the throw and crank arm, respectively, and a resilient spring interposed between said seats.

17. A supporting assembly according to claim 16, wherein one of said seats is pivotally mounted.

18. In an axle assembly, a bracket for connection to the related support member, vertical guides offered by the bracket, a wheel supporting spindle received by the guides and extending therethrough, a throw inboardly of the bracket, said throw being connected to the spindle and extending transversely thereof, a torque shaft rigidly connected to the throw at a point spaced from the connection to the spindle, a crank arm directionally paralleling the throw and having a pivotal connection thereto, a pivotal connection between the crank arm and the bracket, and a torsion bar spring extending between and connected to the crank arm and torque shaft respectively, the longitudinal axis of said spring being common with the axis of pivotal connection between the throw and crank arm.

19. In an axle assembly, a bracket for connection to a related supported member, vertical guides offered by the bracket, a wheel supporting spindle received by the guides and extending therethrough, a throw inboardly of the bracket connected to the spindle and extending transversely thereof, a torque shaft rigidly connected to the throw and in spaced relation to the spindle, a crank arm disposed in a vertical plane parallel to the plane of the throw and having a pivotal connection thereto, a pivotal connection between the crank arm and the bracket, a spring seat connected to the crank arm, another spring seat connected to the throw, one of said seats being movable, and a coiled spring interposed between said seats.

20. An axle assembly according to claim 19, wherein the movable seat is connected to the throw, said movement being accommodated by a pivotal connection therebetween.

References Cited in the file of this patent

UNITED STATES PATENTS

| Number | Name | Date |
|---|---|---|
| 1,824,234 | Rhodes et al. | Sept. 22, 1931 |
| 2,426,513 | Linn | Aug. 26, 1947 |
| 2,438,432 | Edwards | Mar. 23, 1948 |
| 2,480,934 | Julien | Sept. 6, 1949 |

FOREIGN PATENTS

| Number | Country | Date |
|---|---|---|
| 109,083 | Sweden | Sept. 16, 1943 |
| 149,718 | Great Britain | Aug. 26, 1920 |
| 626,484 | Germany | Feb. 27, 1936 |
| 812,732 | France | Feb. 8, 1937 |